(12) United States Patent
Noda

(10) Patent No.: US 7,365,920 B2
(45) Date of Patent: Apr. 29, 2008

(54) FOUR-PIECE LENS ASSEMBLY

(75) Inventor: Sayuri Noda, Taichung (TW)

(73) Assignee: Largan Precision Co., Ltd., His-Tun Dist., Taichung (TW)

( * ) Notice: Subject to any disclaimer, the term of this patent is extended or adjusted under 35 U.S.C. 154(b) by 153 days.

(21) Appl. No.: 11/389,127

(22) Filed: Dec. 28, 2005

(65) Prior Publication Data

US 2007/0146901 A1  Jun. 28, 2007

(51) Int. Cl.
*G02B 9/12* (2006.01)
*G02B 13/18* (2006.01)

(52) U.S. Cl. .................... 359/784; 359/716; 359/738

(58) Field of Classification Search ........ 359/784–786, 359/789, 792
See application file for complete search history.

(56) References Cited

U.S. PATENT DOCUMENTS 6,985,306 B2 * 1/2006 Abe .......................... 359/716

2004/0240080 A1 * 12/2004 Matsui et al. ............... 359/754

FOREIGN PATENT DOCUMENTS

JP    2005-164899    *  6/2005

* cited by examiner

*Primary Examiner*—Jordan M. Schwartz
(74) *Attorney, Agent, or Firm*—Charles E. Baxley

(57) ABSTRACT

A four-piece lens assembly, from the object side, comprises: an aperture, a first lens, a second lens, a third lens, a fourth lens, a flat parallel glass and an image plane. The first lens is a double convex positive lens. The second lens is a double concave negative lens or a plano-concave lens whose object side surface contacts the image side surface of the first lens. The first and second lenses contact each other in such a manner that the concave surface of the connecting surface faces the object side, and the concave surface (or plano surface) of the second lens faces the image plane. The first and second lenses are made of high refractive index material. The lens assembly not only can ensure a necessary back focus but also can suppress the total length of a portable image taking device.

8 Claims, 17 Drawing Sheets

EMBODIMENT 1

Focal Length : f=4.00
(F NO.) :F2.80
Angle of View :2ω=60.3°

|   | r | d | nd | νd |
|---|---|---|---|---|
| S | ∞ | 0.22 | | |
| 1 | 2.879 | 1.34 | 1.74330 | 49.2 |
| 2 | -2.879 | 0.40 | 1.84666 | 23.8 |
| 3 | 51.727 | 0.53 | | |
| 4 | -0.949 | 0.73 | 1.50914 | 56.4 |
| 5 | -1.039 | 0.08 | | |
| 6 | 1.612 | 0.62 | 1.50914 | 56.4 |
| 7 | 1.409 | 0.90 | | |
| 8 | ∞ | 0.80 | 1.51680 | 64.2 |
| 9 | ∞ | | | |

$f/f_{34}=$ 0.375
$f/R_{22}=$ 0.077
$f/R_{42}=$ 2.837 spherical aberration astigmatic difference distortion aberration

EMBODIMENT 2

Focal Length : f=4.00
(F NO.) : F2.80
Angle of View : $2\omega = 60.4°$

|   | r      | d    | nd      | $\nu$d |
|---|--------|------|---------|--------|
| S | ∞      | 0.18 |         |        |
| 1 | 2.939  | 1.44 | 1.74330 | 49.2   |
| 2 | -2.939 | 0.40 | 1.84666 | 23.8   |
| 3 | ∞      | 0.49 |         |        |
| 4 | -0.817 | 0.63 | 1.50914 | 56.4   |
| 5 | -0.925 | 0.08 |         |        |
| 6 | 1.633  | 0.60 | 1.50914 | 56.4   |
| 7 | 1.440  | 0.90 |         |        |
| 8 | ∞      | 0.80 | 1.51680 | 64.2   |
| 9 | ∞      |      |         |        |

$f/f_{34}$ = 0.335
$f/R_{22}$ = 0.000
$f/R_{42}$ = 2.776

EMBODIMENT 3

Focal Length : f=4.00
(F NO.) : F2.78
Angle of View : 2ω=60.9°

|   | r | d | nd | νd |
|---|---|---|---|---|
| S | ∞ | 0.43 | | |
| 1 | 2.871 | 1.21 | 1.80610 | 40.7 |
| 2 | -2.249 | 0.50 | 1.80518 | 25.5 |
| 3 | 5.480 | 0.57 | | |
| 4 | -1.028 | 0.60 | 1.50914 | 56.4 |
| 5 | -0.977 | 0.09 | | |
| 6 | 1.533 | 0.55 | 1.50914 | 56.4 |
| 7 | 1.354 | 0.90 | | |
| 8 | ∞ | 0.80 | 1.51680 | 64.2 |
| 9 | ∞ | | | |

$f/f_{34}$ = 0.592
$f/R_{22}$ = 0.730
$f/R_{42}$ = 2.952

EMBODIMENT 4

Focal Length : f=4.00

(F NO.) :F2.49

Angle of View :2ω=60.9°

|   | r | d | nd | νd |
|---|---|---|---|---|
| S | ∞ | 0.36 | | |
| 1 | 2.804 | 1.27 | 1.74330 | 49.2 |
| 2 | -3.008 | 0.40 | 1.84666 | 23.8 |
| 3 | 38.005 | 0.53 | | |
| 4 | -0.813 | 0.60 | 1.50914 | 56.4 |
| 5 | -0.908 | 0.08 | | |
| 6 | 2.166 | 0.78 | 1.50914 | 56.4 |
| 7 | 1.920 | 0.90 | | |
| 8 | ∞ | 0.80 | 1.51680 | 64.2 |
| 9 | ∞ | | | |

$f/f_{34}=$ 0.350

$f/R_{22}=$ 0.105

$f/R_{42}=$ 2.082 spherical aberration astigmatic difference distortion aberration

EMBODIMENT 5

Focal Length : f=3.73
(F NO.) :F2.61
Angle of View : 2ω=63.9°

|   | r | d | nd | νd |
|---|---|---|---|---|
| S | ∞ | 0.44 | | |
| 1 | 2.945 | 1.21 | 1.74330 | 49.2 |
| 2 | -2.472 | 0.40 | 1.83352 | 24.0 |
| 3 | 1047.441 | 0.56 | | |
| 4 | -0.747 | 0.64 | 1.50914 | 56.4 |
| 5 | -0.832 | 0.08 | | |
| 6 | 1.902 | 0.71 | 1.50914 | 56.4 |
| 7 | 1.673 | 0.90 | | |
| 8 | ∞ | 0.80 | 1.51680 | 64.2 |
| 9 | ∞ | | | |

$f/f_{34}=$ 0.462
$f/R_{22}=$ 0.004
$f/R_{42}=$ 2.230 spherical aberration astigmatic difference distortion aberration

EMBODIMENT 6

Focal Length : f=4.00
(F NO.) :F2.79
Angle of View : $2\omega=60.9°$

|   | r      | d    | nd      | νd   |
|---|--------|------|---------|------|
| S | ∞      | 0.01 |         |      |
| 1 | 3.243  | 1.50 | 1.80610 | 40.7 |
| 2 | -1.824 | 0.43 | 1.80518 | 25.5 |
| 3 | 6.990  | 0.50 |         |      |
| 4 | -1.585 | 0.96 | 1.50914 | 56.4 |
| 5 | -1.344 | 0.09 |         |      |
| 6 | 1.291  | 0.56 | 1.50914 | 56.4 |
| 7 | 1.105  | 0.90 |         |      |
| 8 | ∞      | 0.80 | 1.51680 | 64.2 |
| 9 | ∞      |      |         |      |

$f/f_{34}$ = 0.637
$f/R_{22}$ = 0.572
$f/R_{42}$ = 3.618 spherical aberration astigmatic difference distortion aberration

EMBODIMENT 7

Focal Length : f=4.00
(F NO.) : F2.80
Angle of View : 2ω=61.4°

|   | r | d | nd | νd |
|---|---|---|---|---|
| S | ∞ | 0.30 | | |
| 1 | 2.672 | 1.07 | 1.74330 | 49.2 |
| 2 | −4.438 | 0.40 | 1.84666 | 23.8 |
| 3 | 11.134 | 0.44 | | |
| 4 | −1.213 | 0.92 | 1.50914 | 56.4 |
| 5 | −1.248 | 0.08 | | |
| 6 | 1.420 | 0.60 | 1.50914 | 56.4 |
| 7 | 1.222 | 0.90 | | |
| 8 | ∞ | 0.80 | 1.51680 | 64.2 |
| 9 | ∞ | | | |

$f/f_{34}$ = 0.439
$f/R_{22}$ = 0.359
$f/R_{42}$ = 3.271 spherical aberration astigmatic difference distortion aberration

EMBODIMENT 1
aspherical coefficient

| the surface No. 4 | the surface No. 5 | the surface No. 6 | the surface No. 7 |
|---|---|---|---|
| K= -4.25454E+00 | K= -2.21864E+00 | K= -3.63103E+00 | K= -6.98019E+00 |
| A= -2.33556E-01 | A= -3.35685E-02 | A= -4.50639E-02 | A= -2.38918E-02 |
| B= 1.35655E-01 | B= -5.60203E-02 | B= 1.33200E-02 | B= -8.88790E-05 |
| C= 7.96107E-02 | C= 1.01459E-01 | C= -5.32220E-04 | C= 1.54246E-03 |
| D= -3.14827E-02 | D= -6.56458E-02 | D= -6.08135E-04 | D= -1.72605E-04 |
| E= -2.46545E-02 | E= 4.67754E-02 | E= -2.01818E-05 | E= -1.68001E-04 |
| F= 1.00893E-02 | F= -2.14482E-02 | F= -1.93676E-06 | F= 2.49364E-05 |
| G= -9.09849E-03 | G= 3.48246E-03 | G= 4.15916E-06 | G= 6.09319E-07 |

EMBODIMENT 2
aspherical coefficient

| the surface No. 4 | the surface No. 5 | the surface No. 6 | the surface No. 7 |
|---|---|---|---|
| K= -3.42948E+00 | K= -2.38976E+00 | K= -3.71039E+00 | K= -9.59833E+00 |
| A= -2.03010E-01 | A= -1.32568E-02 | A= -2.87434E-02 | A= -1.12702E-02 |
| B= 1.69629E-01 | B= -5.09961E-02 | B= 7.67927E-03 | B= -3.59993E-03 |
| C= 7.73143E-02 | C= 1.04991E-01 | C= -1.28676E-03 | C= 1.21214E-03 |
| D= -6.32973E-02 | D= -6.38263E-02 | D= -3.28088E-04 | D= -1.36867E-04 |
| E= -3.69289E-02 | E= 4.50288E-02 | E= 5.12541E-05 | E= -1.37906E-04 |
| F= 2.68121E-02 | F= -2.40918E-02 | F= -4.71423E-06 | F= 2.99726E-05 |
| G= -1.67775E-03 | G= 4.77329E-03 | G= -1.71471E-06 | G= -1.99113E-06 |

EMBODIMENT 3

| the surface No. 4 | the surface No. 5 | the surface No. 6 | the surface No. 7 |
|---|---|---|---|
| K= -6.75776E+00 | K= -1.25777E+00 | K= -1.37327E+01 | K= -1.09165E+01 |
| A= -3.98312E-01 | A= -3.36750E-02 | A= 1.26627E-02 | A= -2.77651E-02 |
| B= 1.53651E-01 | B= -4.58334E-02 | B= -5.37056E-03 | B= 5.80753E-03 |
| C= 1.30224E-01 | C= 6.01440E-02 | C= 1.32281E-03 | C= -5.04495E-04 |
| D= -1.16155E-01 | D= -6.71423E-02 | D= -3.51586E-04 | D= -1.10144E-04 |
| E= -6.54725E-02 | E= 6.27113E-02 | E= -1.40685E-05 | E= -1.06343E-04 |
| F= 2.31205E-01 | F= -9.86910E-03 | F= -3.05784E-06 | F= 3.05992E-05 |
| G= -1.19628E-01 | G= -3.70160E-03 | G= 2.58864E-06 | G= -2.10451E-06 |

FIG. 8

EMBODIMENT 4
aspherical coefficient

| the surface No. 1 | the surface No.4 | the surface No. 5 | the surface No. 6 |
|---|---|---|---|
| K= 3.67770E-01 | K= -2.76476E+00 | K= -1.78710E+00 | K= -2.09555E+00 |
| A= 2.23774E-03 | A= -2.40841E-01 | A= -1.88678E-02 | A= -3.49424E-02 |
| B= -2.70179E-02 | B= 2.94752E-01 | B= -3.76832E-04 | B= 1.11787E-02 |
| C= 6.32403E-02 | C= 9.69073E-02 | C= 1.08309E-01 | C= -1.00599E-03 |
| D= -5.78704E-02 | D= -1.92039E-01 | D= -7.17227E-02 | D= -4.99809E-04 |
| E= 1.12718E-02 | E= -9.02451E-02 | E= 3.95055E-02 | E= 3.64849E-05 |
|  | F= 1.88723E-01 | F= -2.67675E-02 | F= 3.77469E-06 |
|  | G= -6.18185E-02 | G= 8.02903E-03 | G= 2.99055E-06 | the surface No. 7
- K= -1.11799E+01
- A= -2.02334E-02
- B= 4.42739E-03
- C= 1.03937E-04
- D= -1.60317E-04
- E= -1.28698E-04
- F= 3.32655E-05
- G= -1.03496E-06

EMBODIMENT 5
aspherical coefficient

| the surface No. 1 | the surface No.3 | the surface No. 4 | the surface No. 5 |
|---|---|---|---|
| K= 1.22367E-01 | K= -3.59505E+06 | K= -2.46927E+00 | K= -1.80771E+00 |
| A= 7.21196E-04 | A= -2.01695E-03 | A= -2.41651E-01 | A= -3.33048E-02 |
| B= 1.12369E-02 | B= -3.63295E-03 | B= 2.06293E-01 | B= -3.95214E-02 |
| C= -5.98758E-02 | C= -9.90181E-05 | C= 8.76586E-02 | C= 1.10382E-01 |
| D= 5.69438E-02 | D= 5.93399E-03 | D= -6.43522E-02 | D= -6.29571E-02 |
|  |  | E= -2.64323E-02 | E= 4.43769E-02 |
|  |  | F= 2.34219E-02 | F= -2.44189E-02 |
|  |  | G= -3.58253E-03 | G= 5.03645E-03 |

| the surface No. 6 | the surface No. 7 |
|---|---|
| A= -2.60116E-02 | A= -7.22942E-03 |
| B= 9.17301E-03 | B= -3.35188E-04 |
| C= -5.03986E-04 | C= 1.44865E-03 |
| D= -3.67841E-04 | D= -1.51816E-04 |
| E= 3.51399E-05 | E= -1.48171E-04 |
| F= -1.42584E-07 | F= 2.88971E-05 |
| G= 9.79529E-07 | G= -5.67897E-07 |

FIG. 9

EMBODIMENT 6
aspherical coefficient

| the surface No. 4 | the surface No. 5 | the surface No. 6 | the surface No. 7 |
|---|---|---|---|
| K= −9.02354E+00 | K= −1.04056E+00 | K= −4.16949E+00 | K= −3.40292E+00 |
| A= −1.79384E−01 | A= −5.03100E−02 | A= −2.45364E−02 | A= −3.27372E−02 |
| B= 1.02975E−03 | B= −1.09881E−02 | B= 5.18583E−03 | B= 3.12983E−03 |
| C= 1.92618E−02 | C= 6.31872E−02 | C= 6.85429E−04 | C= 1.55071E−03 |
| D= −1.30855E−02 | D= −8.71688E−02 | D= −2.34125E−04 | D= −1.32382E−04 |
| E= 1.00209E−03 | E= 4.81582E−02 | E= 3.95059E−06 | E= −1.38287E−04 |
| F= 4.55671E−02 | F= −9.40050E−03 | F= −7.35926E−06 | F= 2.73532E−05 |
| G= −2.72330E−02 | G= 2.91116E−04 | G= 1.73040E−06 | G= −1.23851E−06 |

EMBODIMENT 7
aspherical coefficient

| the surface No. 4 | the surface No. 5 | the surface No. 6 | the surface No. 7 |
|---|---|---|---|
| K= −7.90650E+00 | K= −2.51084E+00 | K= −4.16342E+00 | K= −5.29406E+00 |
| A= −2.42198E−01 | A= −3.46753E−02 | A= −3.74849E−02 | A= −2.51568E−02 |
| B= 1.27758E−01 | B= −6.41213E−02 | B= 1.29773E−02 | B= 1.10752E−03 |
| C= 6.63499E−02 | C= 9.74650E−02 | C= −3.25484E−04 | C= 1.76944E−03 |
| D= −4.26803E−02 | D= −6.65899E−02 | D= −4.96647E−04 | D= −1.53548E−04 |
| E= −2.65577E−02 | E= 4.65610E−02 | E= 5.00170E−07 | E= −1.64325E−04 |
| F= −3.14942E−03 | F= −2.13938E−02 | F= −1.80728E−06 | F= 2.54026E−05 |
| G= 1.62286E−02 | G= 3.87896E−03 | G= 2.93307E−06 | G= 2.27537E−07 |

FIG. 10

FOUR-PIECE LENS ASSEMBLY

BACKGROUND OF THE INVENTION

1. Field of the Invention

The present invention relates to a lens assembly disposed in a portable image taking device, which is suitable for being installed in high resolution CCD type equipments, such as digital camera, computer and the like, and is used for image reading. The lens assembly not only can ensure a comparatively strong negative refractive power, but also can ensure a necessary back focus and a total length of a portable image taking device.

2. Description of the Prior Art

Since the image taking lens assembly has an increasingly wide range of application, particularly for the mobile phone, palm computer (PC), MP3, and etc, the image taking has become one of the necessary functions of these products.

Nowadays, a mobile phone is usually equipped with a solid image sensor and an image taking lens assembly, such as CCD sensor (charge coupled device) or CMOS sensor (Complementary Metal Oxide Semiconductor). To comply with the requirement of miniaturizing the solid image sensor and the image taking lens assembly as well as improving the performance thereof, four-piece lens assembly in the products needs to be miniaturized and its performance thereof also needs to be improved. Therefore, with the popularization of photographic mobile phone, the research and development of the mobile phone is becoming more and more urgent. Hence, how to develop a four-piece lens assembly more satisfying the user's requirements has become an important consideration of the manufacturer.

In the early days when the mobile phone was equipped with the imaging taking device, the resolution of the CCD image taking lens assembly is at most up to 110-300 K pixels, and its size is at most miniaturized to $1/7$-$1/4$ inch. This relatively low requirement of optical performance can be easily satisfied as along as the image taking lens assembly has 1-2 lenses. Meanwhile, the total length of the optical system should be controlled properly for matching the thickness of the mobile phone, and for ensuring that the expected back focus can be easily achieved.

However, the resolution of the CCD inside the mobile phone has also been being increased year by year to Megapixel, in order that the optical performance of the image taking lens assembly can be improved correspondingly, the conventional configuration of the lens assembly having 1-2 lenses is unable to achieve the required performance. Therefore, a high performance lens assembly should be made up of 4 pieces of lenses, it will be unable to achieve an expected total length of the optical system and to ensure a required back focus either. Furthermore, it is also unable to arrange the IR cut filter and similar optical components.

For example, JP Pat. No. 2003-255222 discloses an image taking lens assembly consisted of 4 pieces of lenses, which is used in the optimum optical system of the digital camera. However, if the use of small type CCD smaller than $1/4$ inch is set as a criterion, it is unsuitable for high level image taking lens assembly due to the back focus is shortened. If the back focus is ensured by increasing the size of the CCD lens assembly, the total length of the optical system will be lengthened. Due to the comparatively small and limited space of an ordinary mobile phone, the conventional configuration is impossible to satisfy the double requirement of quality and space.

The present invention has arisen to mitigate and/or obviate the afore-described disadvantages.

SUMMARY OF THE INVENTION

The primary objective of the present invention is to provide a four-piece lens assembly that is capable of ensuring a required back focus. The image taking lens assembly in accordance with the present invention, from the object side, comprises: an aperture, a first lens, a second lens, a third lens, a fourth lens, a flat parallel glass and an image plane. The first lens is a double convex positive lens. The second lens is a double concave negative lens or a plano-concave lens whose object side surface contacts the image side surface of the first lens. Such arrangements guarantee that the second lens has a comparatively strong negative refractive power, and the portable image taking device has a required back focus.

The secondary objective of the present invention is to provide a four-piece lens assembly that is capable of suppressing the total length of the lens assembly while ensuring an expected back focus. The first and second lenses contact each other in such a manner that the concave surface of the connecting surface faces the object side, and the concave surface (or plano surface) of the second lens faces the image plane. The first and second lenses are made of high refractive index material. The lens assembly is more suitable for being installed in high resolution image taking lens assembly and used for image reading, it not only can ensure a necessary back focus but also can suppress the total length of a portable image taking device.

The present invention will become more obvious from the following description when taken in connection with the accompanying drawings, which show, for purpose of illustrations only, the preferred embodiments in accordance with the present invention.

BRIEF DESCRIPTION OF THE DRAWINGS

FIG. 8 shows the data of the aspherical surface of the lenses assembly in accordance with the embodiments 1-3;

FIG. 9 shows the data of the aspherical surface of the lenses assembly in accordance with the embodiments 4-5; and FIG. 10 shows the data of the aspherical surface of the lenses assembly in accordance with the embodiments 6-7.

DETAILED DESCRIPTION OF THE PREFERRED EMBODIMENTS

Figure 1A:
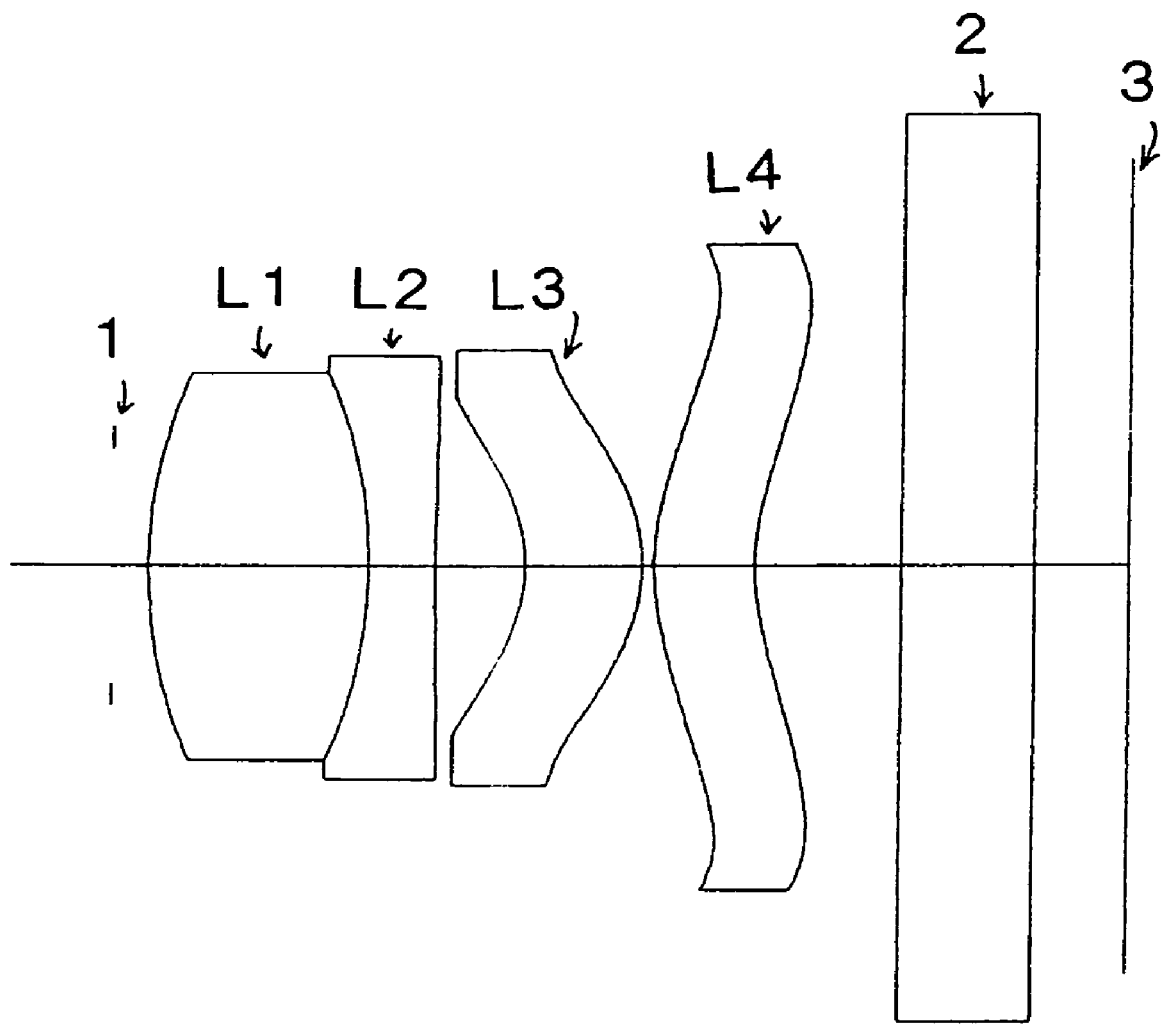
FIG. 1A is an illustrative view of showing the configuration of a four-piece lens assembly in accordance with a first embodiment the present invention.
Figure 1B:
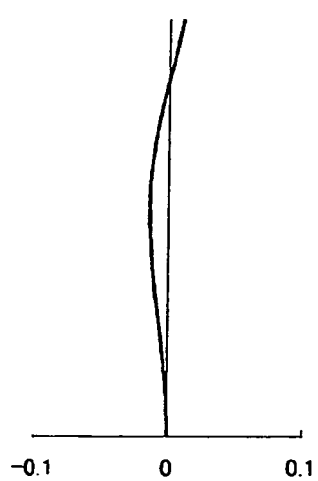
FIG. 1B shows the aberration correction and the optical data of the first embodiment the present invention.
Figure 1B:
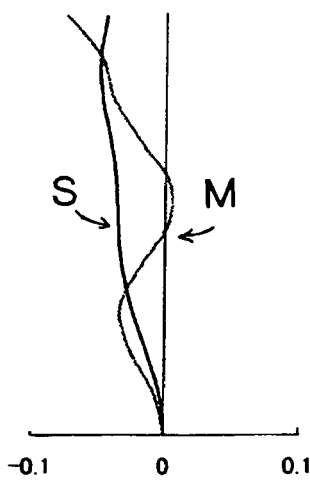
Figure 1B:
Figure 2A:
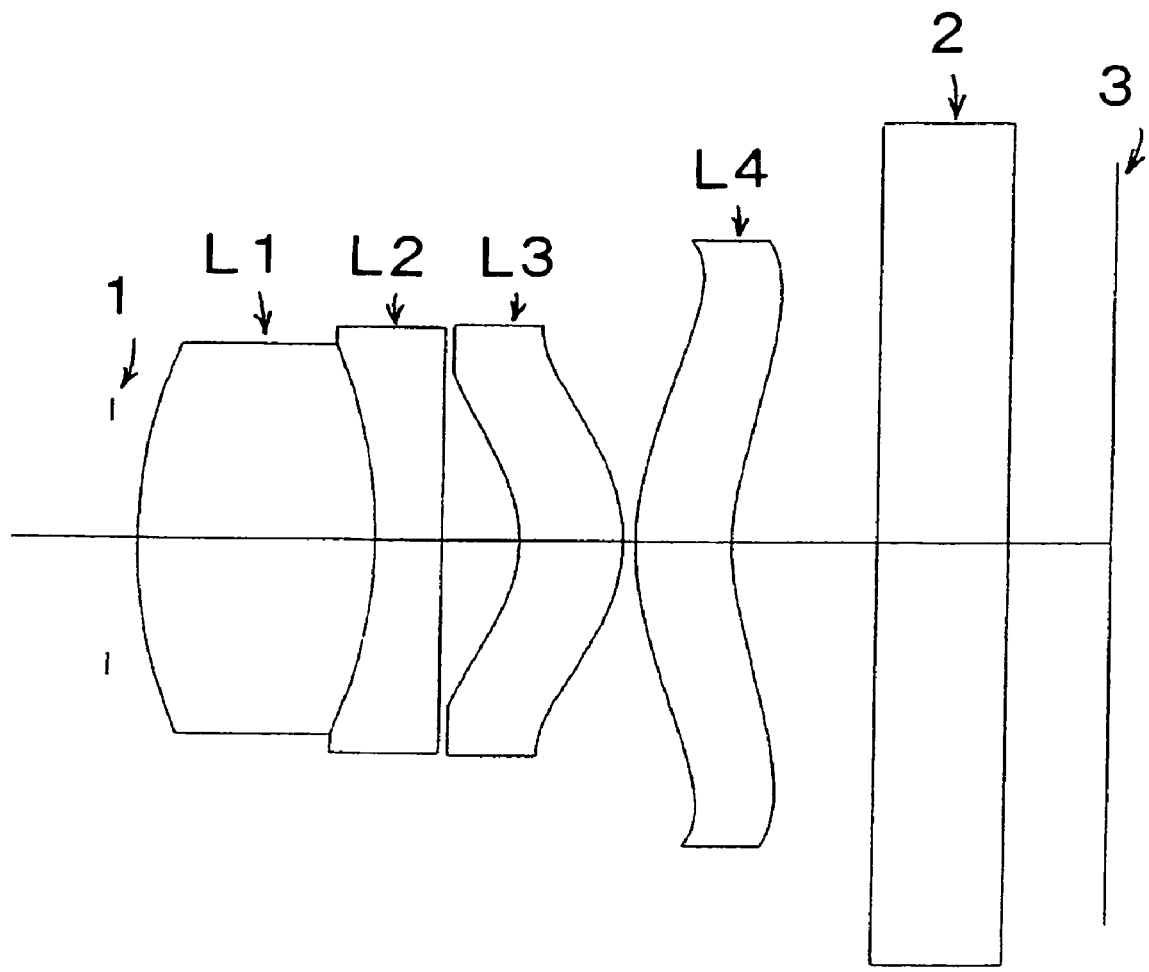
FIG. 2A is an illustrative view of showing the configuration of a four-piece lens assembly in accordance with a second embodiment the present invention.
Figure 2B:
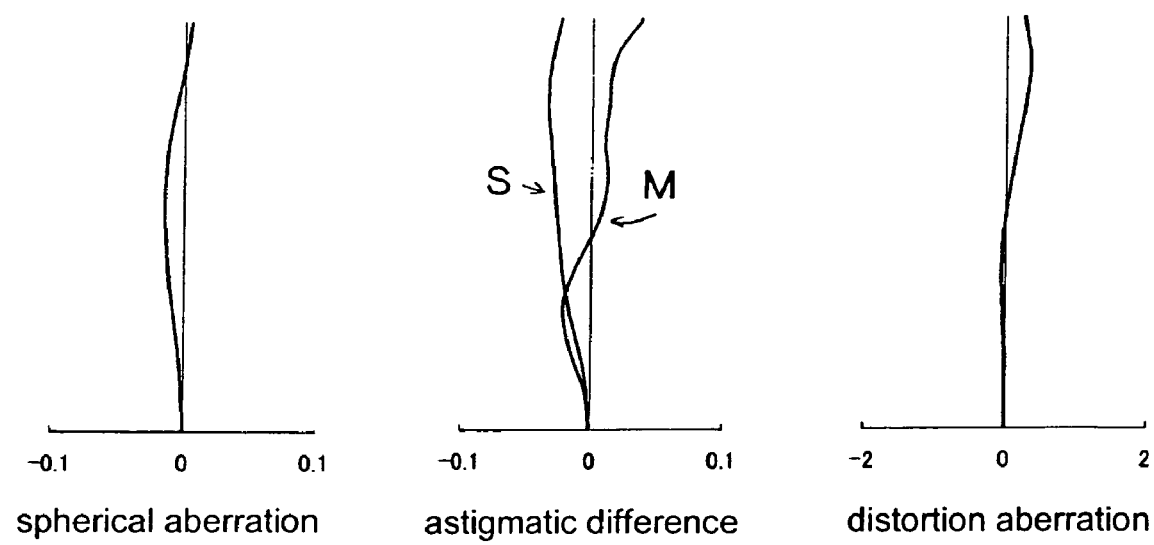
FIG. 2B shows the aberration correction and the optical data of the second embodiment the present invention.
Figure 3A:
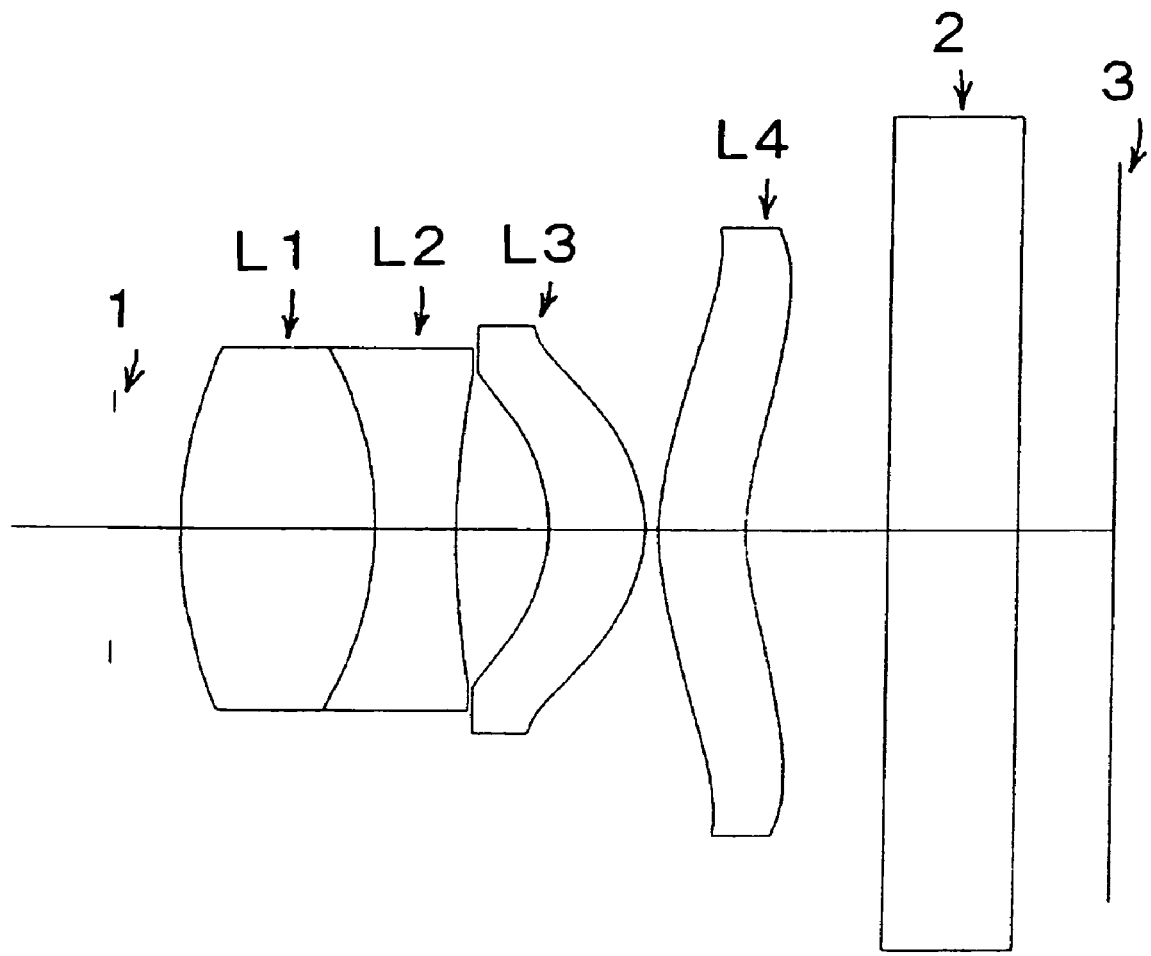
FIG. 3A is an illustrative view of showing the configuration of a four-piece lens assembly in accordance with a third embodiment the present invention.
Figure 3B:
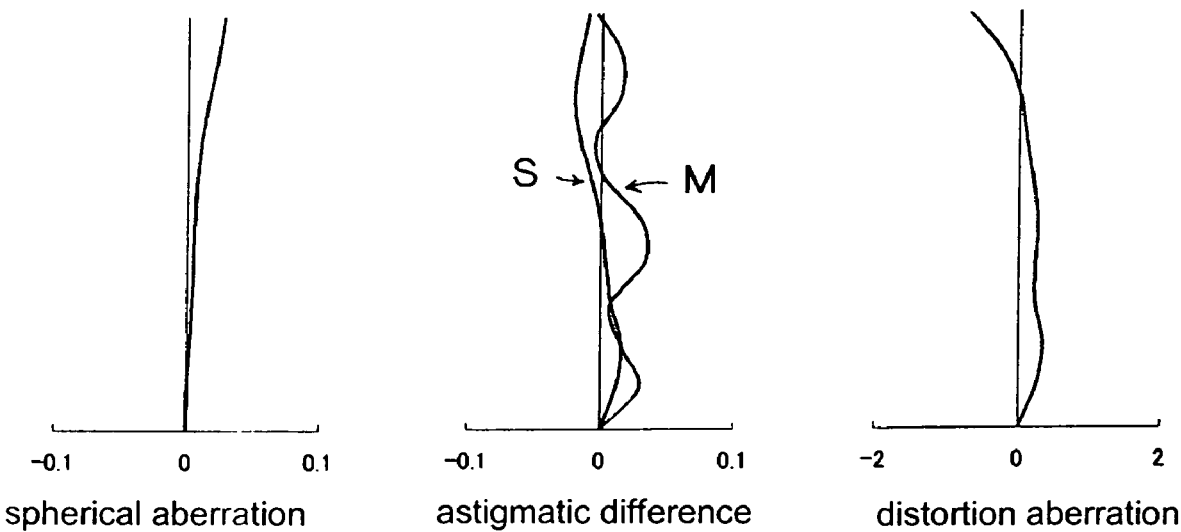
FIG. 3B shows the aberration correction and the optical data of the third embodiment the present invention.
Figure 4A:
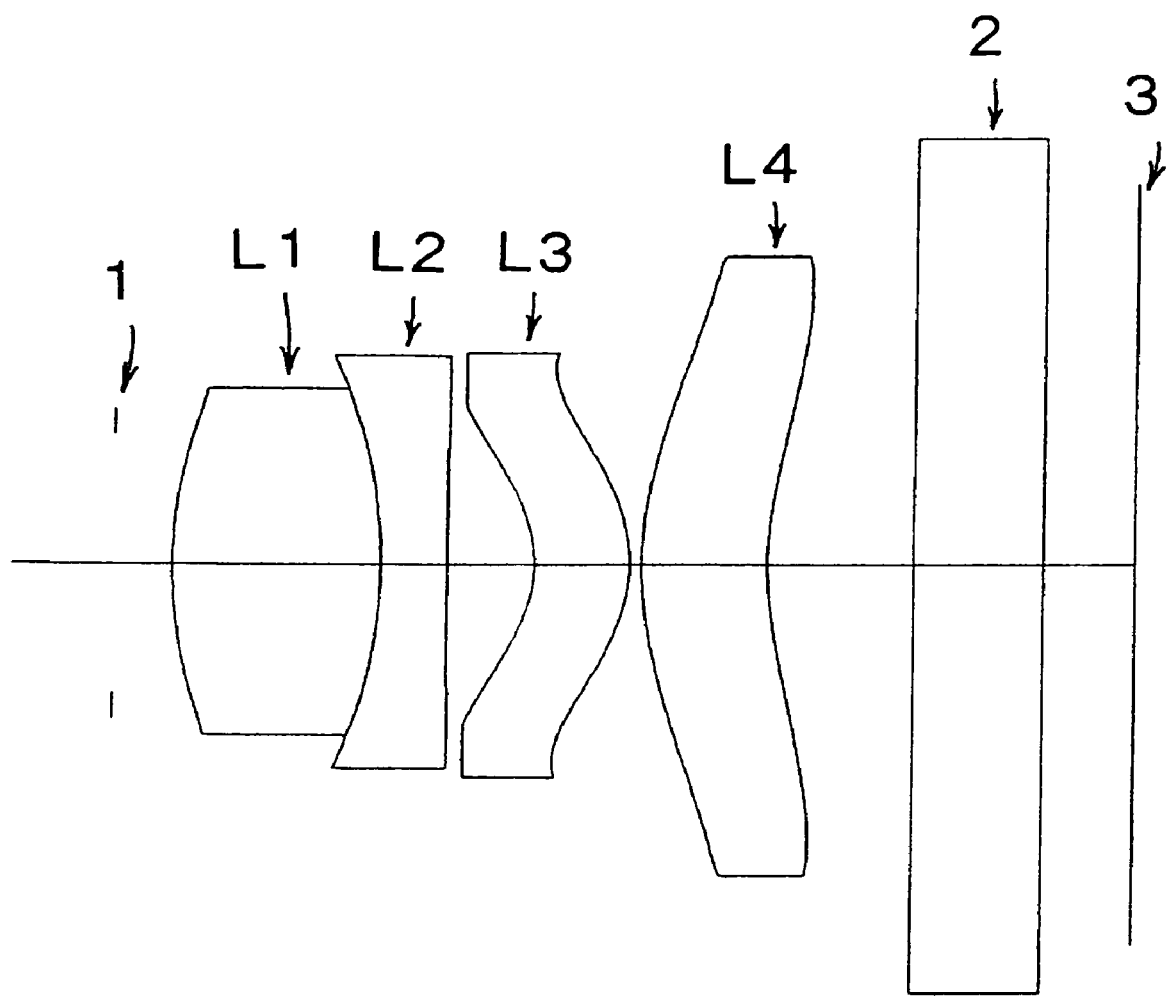
FIG. 4A is an illustrative view of showing the configuration of a four-piece lens assembly in accordance with a fourth embodiment the present invention.
Figure 4B:
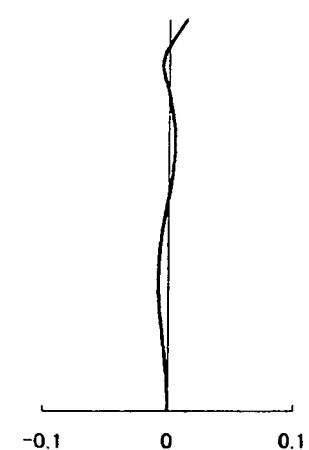
FIG. 4B shows the aberration correction and the optical data of the fourth embodiment the present invention.
Figure 4B:
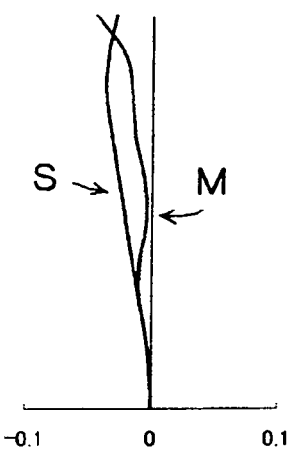
Figure 4B:
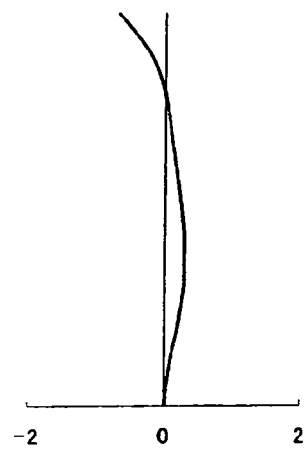
Figure 5A:
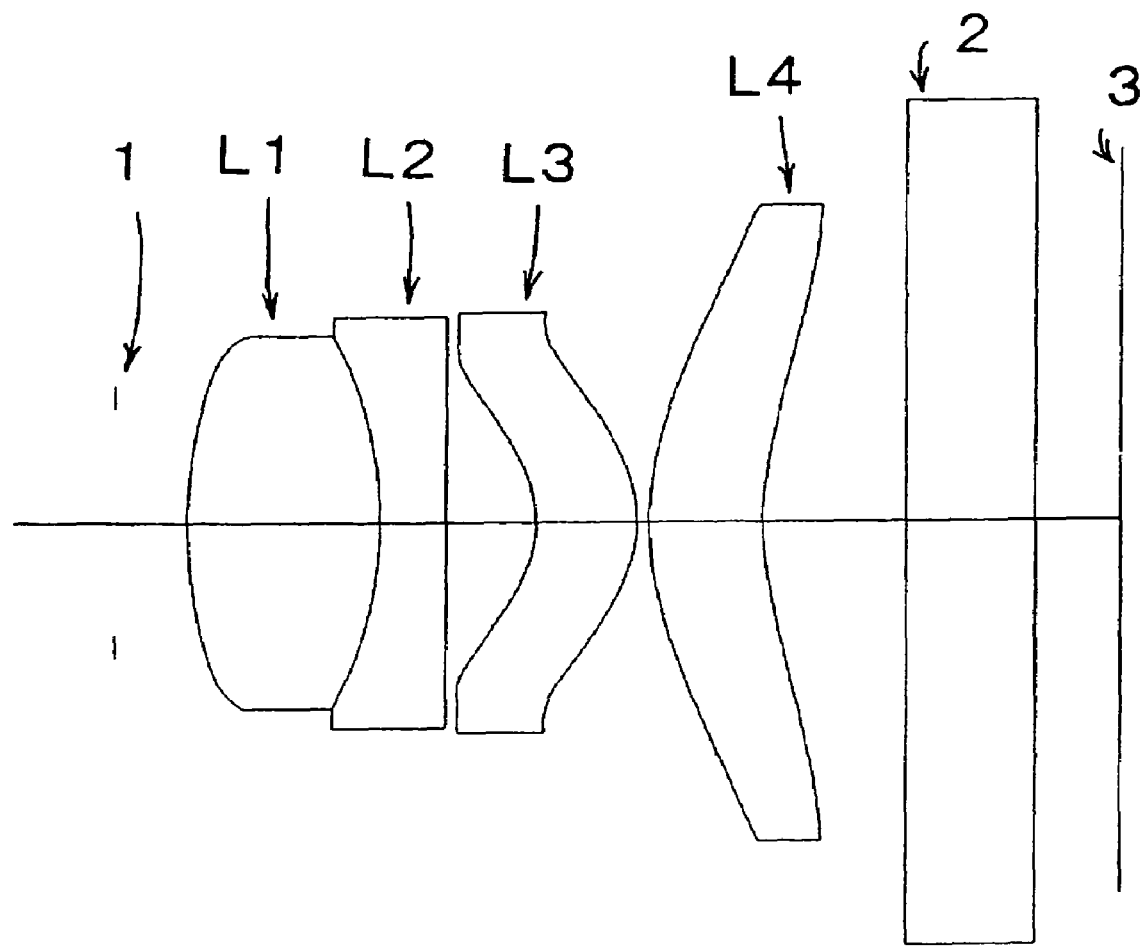
FIG. 5A is an illustrative view of showing the configuration of a four-piece lens assembly in accordance with a fifth embodiment the present invention.
Figure 5B:
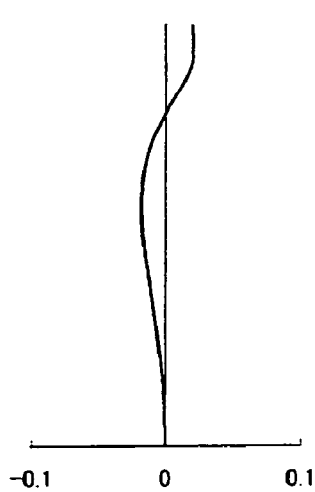
FIG. 5B shows the aberration correction and the optical data of the fifth embodiment the present invention.
Figure 5B:
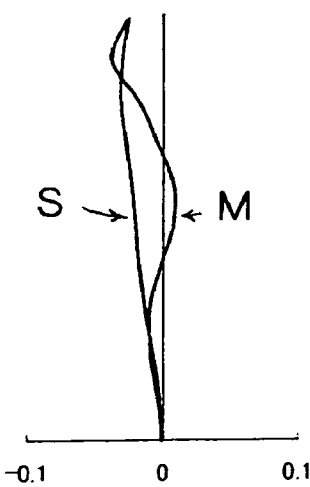
Figure 5B:
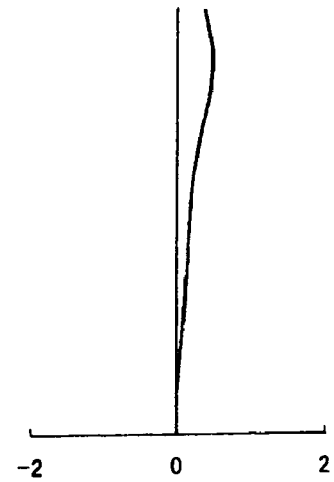
Figure 6A:
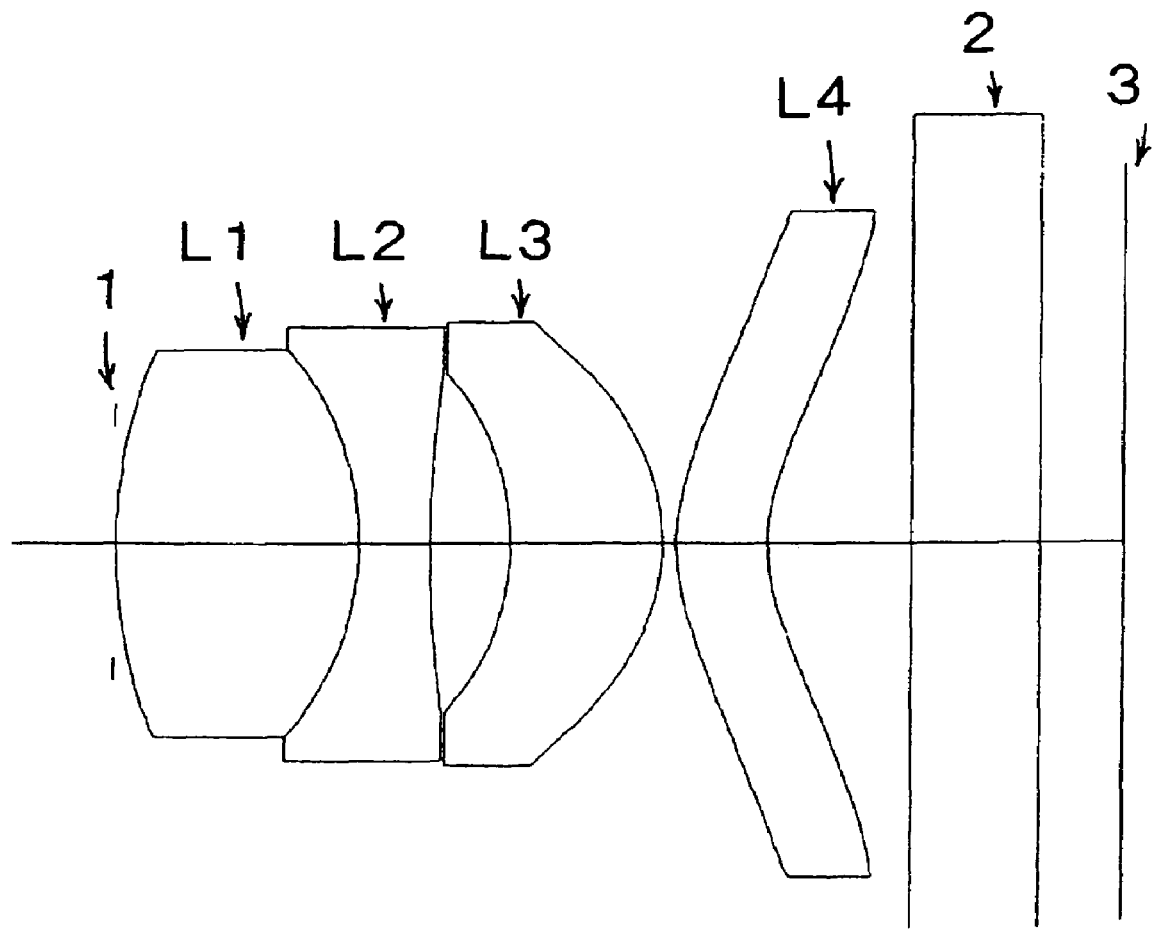
FIG. 6A is an illustrative view of showing the configuration of a four-piece lens assembly in accordance with a sixth embodiment the present invention.
Figure 6B:
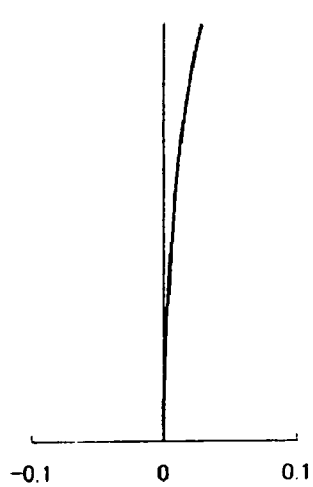
FIG. 6B shows the aberration correction and the optical data of the sixth embodiment the present invention.
Figure 6B:
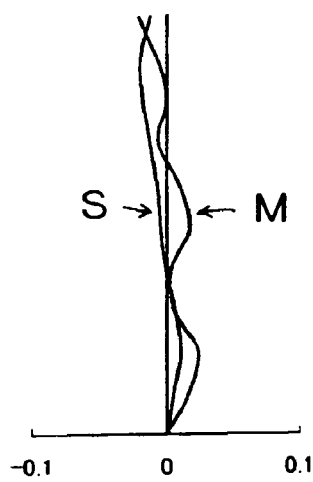
Figure 6B:
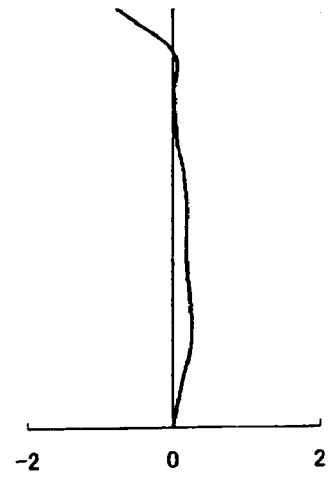
Figure 7A:
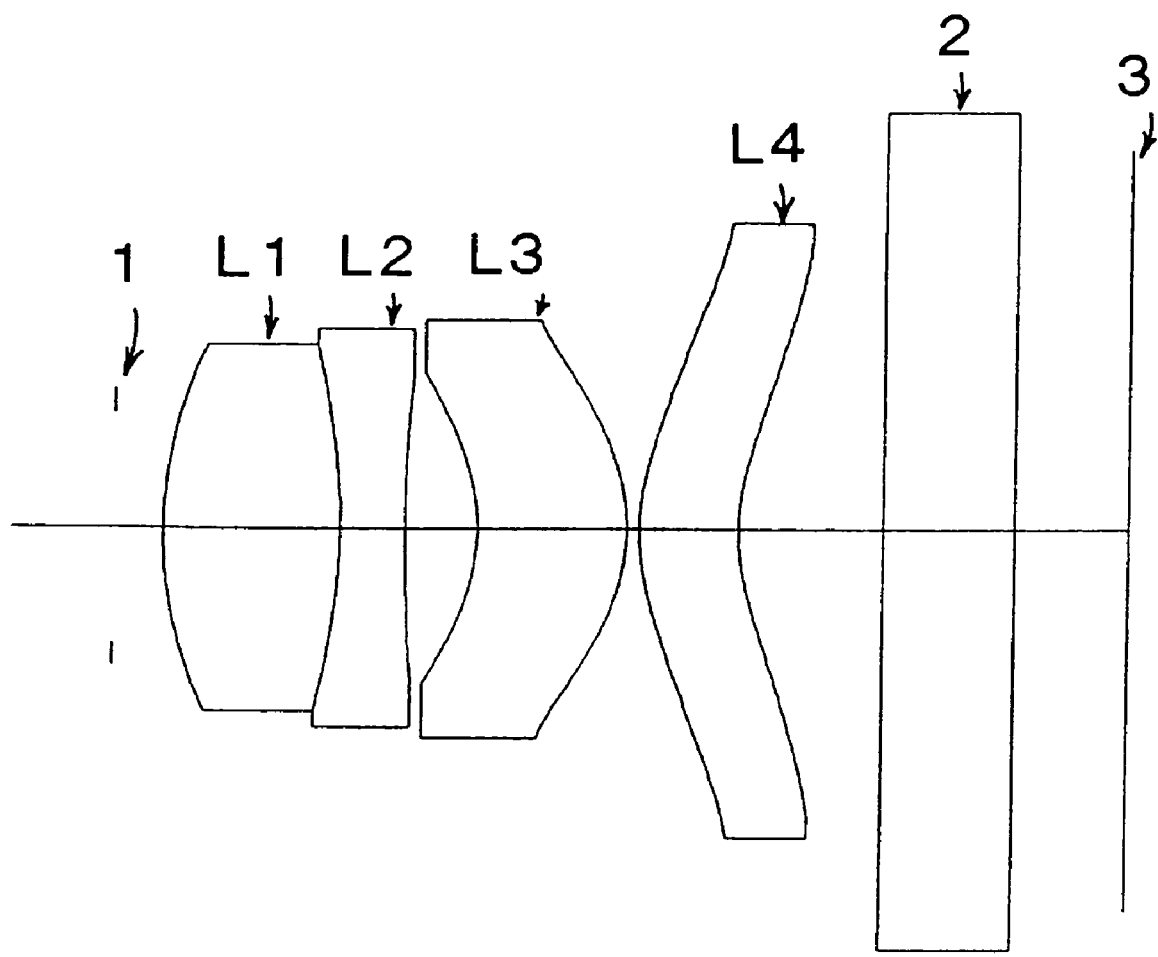
FIG. 7A is an illustrative view of showing the configuration of a four-piece lens assembly in accordance with a seventh embodiment the present invention.
Figure 7B:
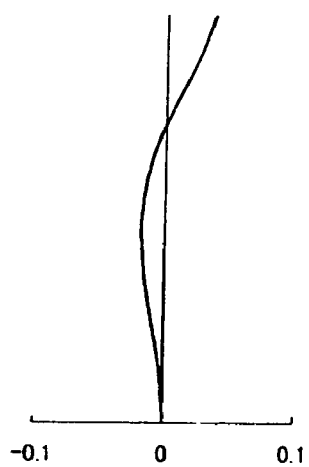
FIG. 7B shows the aberration correction and the optical data of the seventh embodiment the present invention.
Figure 7B:
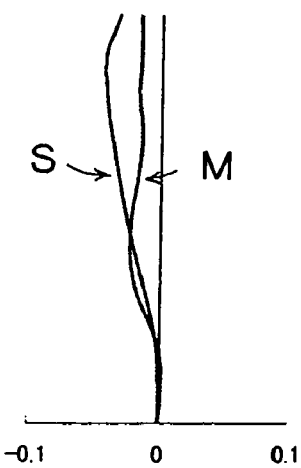
Figure 7B:
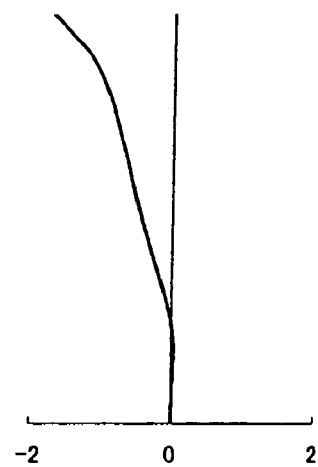

The foregoing, and additional objects, features and advantages of the present invention will become apparent from the following detailed description of preferred embodiments thereof, taken in conjunction with the accompanying drawings, in which, FIGS. 1A-7A show the configuration of a four-piece lens assembly in accordance with the embodiments 1-7 of the present invention, FIGS. 1B-7B show the aberration correction and the optical data of the embodiments 1-7 of the present invention, and FIGS. 8-10 are diagrams for showing the data of the aspherical surface of the lenses in accordance with the embodiments 1-7.

Referring to FIGS. 1A-7A, all the image taking lens assemblies of the respective embodiments of the present invention comprise the following four pieces of lenses:

The components of the image taking lens assembly, from the object side, comprises: an aperture 1, a first lens L1, a second lens L2, a third lens L3, a fourth lens L4, a flat parallel glass 2 and an image plane 3. The aperture 1 faces the object side, and the image side is located in the opposite direction.

The first lens L1 is a double convex positive lens made of high refractive index material.

The second lens L2 is a double concave negative lens or a plano-concave (the concave surface faces the object side) lens whose object side surface contacts the image side surface of the first lens L1. In this present invention, only the second embodiment 2 is a plano-convex negative lens (the rest embodiments are double concave negative lens), in addition, the lens L2 is also made of high refractive index material.

The third lens L3 is a convex-concave positive lens whose convex surface facing the image side and has at least an aspherical refractive surface.

The fourth lens L4 is a convex-concave positive lens whose convex surface facing the object side and has at least an aspherical refractive surface.

The third lens L3 and the fourth lens L4 are formed by plastic injection forming and both are made of low refractive index material. In addition, both sides of the third and fourth lenses L3 and L4 of the embodiments 1-7 are aspherical surfaces.

In addition, the parallel glass 2 in the drawing has IR cut filter function, and an image reading device (such as CCD) can be pre-set on the image plane 3.

Referring to FIGS. 1B-7B, which illustrate the elements of the lens assembly of respective embodiments, and the aberration correction data thereof. At the top of the figures are shown various factors affecting the lenses, including focal length, F Number, angle of view, etc.

The data symbols in the following tables are explained below:

S, 1, 2 . . . 9 represent the sequence numbers of the surfaces of the respective lenses from the object side (but S represents the aperture). Due to the first lens L1 and the second lens L2 contacts each other, the surface No 2 is the common surface of the lenses L1 and L2. the surfaces Nos 8 and 9 are two sides of the flat parallel glass, therefore, both will become ∞.

r represents the paraxial radius (mm) of curvature d represents surface separation nd represents the refractive index of the respective lenses and the flat parallel glass vd represents aberration coefficient of the respective lenses and the flat parallel glass f represents the total focal length of the lens assembly $f_{34}$ represents combined focal length of the third and fourth lenses L3 and L4

$f_{22}$ represents the radius of curvature of the image side surface of the second lens L2

$f_{42}$ represents the radius of curvature of the image side surface of the fourth lens L4

The aberration correction diagrams include spherical aberration, astigmatic difference and distortion aberration, and are all about data of the line d. The astigmatic difference is the data of the sagittal image surface and the meridional.

The aspherical shape is particularly illustrated in of FIGS. 8-10 and explained as follows. The coefficients of the aspherical shape are indicated by A, B, C, D, E and F. H is the height of the optical axis, and the deflection of the optical axis is X. The present invention can satisfy the following equation:

$$X = (1/R)H^2/[1+\{1-(1+K)(H/R)^2\}^{1/2}] + AH^4 + BH^5 + CH^8 + DH^{10} + EH^{12} + FH^{14} + GH^{16}$$

R represents the paraxial radius of curvature

K represents the conical coefficients

E represents the aspherical coefficient, and E-03 represents $10^{-3}$.

Regarding the image taking lens assembly of the present invention, the range of f, $f_{34}$, $R_{22}$, $R_{42}$ can satisfy the following relations:

$$(1) 0.3 < f/f34 < 0.65$$

If $f/f_{34} \leq 0.3$, since the power of the combination of the first and second lenses will become too large, this will cause difficulties in correcting of spherical difference and image difference. If $f/f_{34} \geq 0.65$, the third and fourth lenses are made plastic material, the amount of displacement of the focus position caused by temperature changes will be increased.

$$0.0 \leq f/R_{22} < 0.75 \qquad (2)$$

If $f/R_{22} < 0$ due to the negative power of the second lens will be reduced, it is impossible to ensure enough back focus. If $f/R_{22} \geq 0.75$, $R_{22}$ will be reduced. In order to ensure the collision height of the object side surface of the third lens, it is necessary to leave enough air space in the axis of the third lens, therefore miniaturization becomes difficult. Hence, it is difficult to be assembled in the limited space of the mobile phone.

$$2.0 < f/R_{42} < 3.7 \qquad (3)$$

If $f/R_{42} \geq 2.0$ the shape difference of the peripheral portion (the adjacent portion of the point of inflexion/bent portion) of the lenses will be increased, the performance of the portion from the center of the image to the periphery thereof is poor. If $f/R_{42} \geq 3.7$, the amount of sag of the peripheral portion will be increased, the distance to the flange backing (the distance from the flange surface at which the lens being assembled to the back focus) of the image plane will be shortened. The result is that it will impossible to guarantee enough space for insertion of the IR filter and the cover glass.

Besides, the actual data of the embodiments 1-7 are shown in table 1.

TABLE 1

|  | f/f34 | f/$R_{22}$ | f/$R_{42}$ |
|---|---|---|---|
| EMBODIMENT 1 | 0.375 | 0.077 | 2.837 |
| EMBODIMENT 2 | 0.335 | 0 | 2.776 |
| EMBODIMENT 3 | 0.592 | 0.73 | 2.952 |
| EMBODIMENT 4 | 0.35 | 0.105 | 2.082 |
| EMBODIMENT 5 | 0.462 | 0.004 | 2.23 |
| EMBODIMENT 6 | 0.637 | 0.572 | 3.618 |
| EMBODIMENT 7 | 0.439 | 0.359 | 3.271 |

It is understood from the data of the respective embodiments that the first lens L1 and the second lens L2 are made of high refractive index material. The third lens L3 and the fourth lens L4 can be made of general low refractive index material. Therefore, the comparatively expected refractive index range of the first and second lenses L1 and L2 will be:

The first lens•••1.85>n d >1.65

The second lens•••1.85>n d >1.75

Choosing the above refractive index range can guarantee the optical performance, meanwhile, the total length of the optical system can be suppressed, and so it is very suitable for the optical system hidden inside the mobile phone. Also because the lenses are miniaturized, even the use of an expensive high refractive index material will have little influence on the cost. Even so, from the point of view of cost, it doesn't matter if using the high refractive index material within the aforementioned range.

Regarding the embodiments 1-7, the summation of data of d (the surface separation) is the total length of the lens assembly (however, the portion of the flat parallel glass is calculated by converting the air space into distance), and the total length is shown in table 2:

|  | TOTAL LENGTH |
|---|---|
| EMBODIMENT 1 | 5.92 |
| EMBODIMENT 2 | 5.88 |
| EMBODIMENT 3 | 5.99 |
| EMBODIMENT 4 | 6.01 |
| EMBODIMENT 5 | 6.01 |
| EMBODIMENT 6 | 5.99 |
| EMBODIMENT 7 | 5.94 |

It is understood from the table 2 that the lens assembly of the present invention is really suitable for being used in the mobile phone.

In addition, it is also understood from FIGS. 1A-7A that regarding the back focus of the respective embodiments can be ensured. The consequence is that the present invention is applicable to the high resolution CCD type image taking lens assembly, it not only can guarantee the optical performance, but also can suppress the total length of the optical system. For example, it is suitable for the miniaturized and high resolution image taking lens assembly, especially for the image taking lens assembly hidden in the mobile phone.

As stated above, the image taking lens assembly in accordance with the present invention, from the object side, comprises: an aperture, a first lens, a second lens, a third lens, a fourth lens, a flat parallel glass and an image plane. The first lens is a double convex positive lens. The second lens is a double concave negative lens or a plano-concave lens whose object side surface contacts the image side surface of the first lens. The third lens is a convex-concave positive lens whose convex surface facing the image side and has at least an aspherical refractive surface. The fourth lens is a convex-concave positive lens whose convex surface facing the object side and has at least an aspherical refractive surface. Therefore, the present invention is applicable to the high resolution image taking lens assembly, it not only can guarantee the back focus, but also can suppress the total length of the optical system.

While we have shown and described various embodiments in accordance with the present invention, it should be clear to those skilled in the art that further embodiments may be made without departing from the scope of the present invention.

What is claimed is:

1. An four-piece lens assembly, in order from the object side, consisting of: an aperture, a first lens, a second lens, a third lens, a fourth lens, a flat parallel glass and an image plane; wherein the first lens is a double convex positive lens;

the second lens is a double concave negative lens or a plano-concave lens, and an object side surface of the second lens contacts an image side surface of the first lens;

the third lens is a convex-concave positive lens whose convex surface facing the image side and has at least an aspherical refractive surface; and the fourth lens is a convex-concave positive lens whose convex surface facing the object side and has at least an aspherical refractive surface;

a total focal length of the lens assembly is f, and a radius of curvature of an image side surface of the fourth lens is $R_{42}$, then they satisfy the relation of:

2.0<f/$R_{42}$<3.7.

2. The four-piece lens assembly as claimed claim 1, wherein a total focal length of the lens assembly is f, and a combined focal length of the third and fourth lenses is $f_{34}$, they satisfy the relation of:

0.3<f/$f_{34}$<0.65.

3. The four-piece lens assembly as claimed claim 1, wherein a total focal length of the lens assembly is f, and a radius of curvature of an image side surface of the second lens is [$f_{22}$] $R_{22}$, then they satisfy the relation of:

0.0≦f/$R_{22}$<0.75.

4. The four-piece lens assembly as claimed claim 2, wherein a total focal length of the lens assembly is f, and a radius of curvature of an image side surface of the second lens is [$f_{22}$] $R_{22}$, then they satisfy the relation of:

0.0≦f/$R_{22}$<0.75.

5. The four-piece lens assembly as claimed claim 1 is hidden in a portable image taking device.

6. The four-piece lens assembly as claimed claim 2 is hidden in a portable image taking device.

7. The four-piece lens assembly as claimed claim 3 is hidden in a portable image taking device.

8. The four-piece lens assembly as claimed claim 4 is hidden in a portable image taking device.

* * * * *